United States Patent
Kim et al.

(10) Patent No.: US 9,686,711 B2
(45) Date of Patent: Jun. 20, 2017

(54) METHOD AND APPARATUS FOR ACTIVATING AND DEACTIVATING SERVING CELL

(71) Applicant: ELECTRONICS AND TELECOMMUNICATIONS RESEARCH INSTITUTE, Daejeon (KR)

(72) Inventors: Kyung Sook Kim, Daejeon (KR); Sang Chul Oh, Daejeon (KR); Young Jick Bahg, Daejeon (KR); Yeon Seung Shin, Daejeon (KR); Pyeong Jung Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 118 days.

(21) Appl. No.: 14/611,925

(22) Filed: Feb. 2, 2015

(65) Prior Publication Data

US 2015/0230221 A1 Aug. 13, 2015

(30) Foreign Application Priority Data

Feb. 13, 2014 (KR) ........................ 10-2014-0016915

(51) Int. Cl.
| | | |
|---|---|---|
| H04W 56/00 | (2009.01) |
| H04W 28/02 | (2009.01) |
| H04W 24/02 | (2009.01) |
| H04L 5/00 | (2006.01) |
| H04W 16/32 | (2009.01) |
| H04W 92/20 | (2009.01) |
| H04W 72/04 | (2009.01) |

(52) U.S. Cl.
CPC ....... *H04W 28/0236* (2013.01); *H04W 24/02* (2013.01); *H04L 5/001* (2013.01); *H04L 5/0032* (2013.01); *H04L 5/0098* (2013.01); *H04W 16/32* (2013.01); *H04W 72/042* (2013.01); *H04W 92/20* (2013.01)

(58) Field of Classification Search
None
See application file for complete search history.

(56) References Cited

U.S. PATENT DOCUMENTS

| 2011/0151882 A1 | 6/2011 | Hwang et al. |
| 2013/0201973 A1* | 8/2013 | Ye ................... H04W 72/0406 370/336 |

OTHER PUBLICATIONS

3GPP TS 36.321 (V11.3.0) "3rd Generation Partnership Project; Technical Specification Group Radio Access Networrk; Evolved Universal Terrestrial Radio Access (E-UTRA); Medium Access Control (MAC) protocol specification (Release 11)", Lte Advanced, 3GPP, Jun. 2013 (57 pages, in English).

* cited by examiner

Primary Examiner — Fan Ng
(74) Attorney, Agent, or Firm — NSIP Law

(57) ABSTRACT

According to an exemplary embodiment of the present invention, a master base station selects a target serving cell in which a state is changed, among the serving cells of at least one slave base station set in the terminal, generates a MAC control element which instructs a state change of the target serving cell, and then directly transmits the MAC control element to the terminal in the case of an uplink asynchronous state between the target slave base station managing the target serving cell and the terminal.

17 Claims, 10 Drawing Sheets

METHOD AND APPARATUS FOR ACTIVATING AND DEACTIVATING SERVING CELL

CROSS-REFERENCE TO RELATED APPLICATION

This application claims priority to and the benefit of Korean Patent Application No. 10-2014-0016915 filed in the Korean Intellectual Property Office on Feb. 13, 2014, the entire contents of which are incorporated herein by reference.

BACKGROUND OF THE INVENTION (a) Field of the Invention

The present invention relates to a method and apparatus for activating and deactivating a serving cell.

(b) Description of the Related Art

A carrier aggregation technology is a technology for expanding service bandwidth, and a terminal may simultaneously receive services through a primary cell and a plurality of secondary serving cells.

Recently, according to a dual connectivity technology which is being discussed in the 3GPP standardization, the terminal may simultaneously receive services through serving cells of different base stations in which a backhaul delay occurs.

According to the carrier aggregation technology according to the related art, the primary serving cell of the terminal maintains an activation state and the secondary serving cells of the terminal are controlled in an activation state or a deactivation state by an activation/deactivation medium access control (MAC) control element (CE) or secondary serving cell deactivation timers (sCellDeactivationTimer) which are set in each of the secondary serving cells. The secondary serving cells which are added to the terminal maintain the deactivation state by an RRC signaling message. When the terminal receives the activation/deactivation MAC CE which represents the activation of the secondary serving cells set in the terminal, the corresponding secondary serving cell is activated, and when the terminal receives the activation/deactivation MAC CE which represents the deactivation of the secondary serving cells set in the terminal, the secondary serving cell is deactivated. The activation/deactivation MAC CE instructs the activation or the deactivation of the serving cell set in the terminal.

FIG. 1 is a diagram illustrating the activation/deactivation MAC CE according to the related art, in which the terminal performs an activation procedure on the secondary serving cell set as a secondary serving cell index i when a $C_i$ value of the activation/deactivation MAC CE is set to be 1, and performs a deactivation procedure on the secondary serving cell set as the secondary serving cell index i when the $C_i$ value is set to be 0. The $C_i$ is an individual field which instructs the activation or the deactivation of the secondary serving cell set as the secondary serving cell index i which is allocated to a specific terminal.

When the secondary serving cell set in the terminal is activated, the terminal transmits a sounding reference signal (SRS) to the corresponding secondary serving cell, reports channel state information (CSI) on the corresponding secondary serving cell, and performs monitoring of a physical downing control channel (PDDCH) of the corresponding secondary serving cell.

When the secondary serving cells set in the terminal are deactivated, the terminal stops SRC transmission to the corresponding secondary serving cell, stops the CSI report to the corresponding secondary serving cell, and stops monitoring of the PDCCH of the corresponding secondary serving cell.

When the terminal receives uplink allocation information or downlink allocation information through the PDCCH of the secondary serving cell, the terminal restarts the secondary serving cell deactivation timer. When the terminal receives the uplink allocation information or downlink allocation information on the secondary serving cells through the PDCCH of the serving cell which schedules the secondary serving cells, the terminal restarts the secondary serving cell deactivation timer.

The carrier aggregation technology according to the related art may secure synchronization of deactivation timer values of the secondary serving cells and the activation and deactivation states of each of the secondary serving cells between the primary serving cell and each of the secondary serving cells, under an inter-cell aggregation environment in which a backhaul delay does not occur.

However, there is a problem in that the deactivation timer values of the secondary serving cells and the activation and deactivation states of each of the secondary serving cells which restart depending on whether each of the secondary serving cells is scheduled in a TTI unit under the cell aggregation environment between the base stations in which the backhaul delay occurs are not determined in the serving cells of the different base stations in real time.

Further, the activation/deactivation MAC CE includes not only activation and deactivation indicators of the serving cell of the base station transmitting the activation/deactivation MAC CE but also activation and deactivation indicators of serving cells of other base stations. Therefore, when the activation/deactivation MAC CE is transmitted from each of the base stations to the terminal in the state in which the activation and deactivation states of the serving cells between the base stations mismatch each other, the terminal performs the activation or deactivation procedure of each of the serving cells set in the terminal depending on the activation/deactivation MAC CE, such that the states of the serving cells between the base stations and the terminal mismatch each other.

Further, under the cell aggregation environment between a master Enb (MeNB) which manages connection information of the terminal and manages traffic transmitted to the terminal and a slave Enb (SeNB) additionally set for traffic transmission to the terminal, in the case in which data are transferred from the MeNB to the SeNB, when the MeNB does not transfer the data to the SeNB in the state in which the serving cell of the SeNB set in the terminal is in an activation state, the serving cell resource of the SeNB is unused and thus a load of the MeNB may not be dispersed, and if the MeNB continuously transfers the data to the SeNB in the state in which the serving cell of the SeNB set in the terminals is in the deactivation state, a buffer of the serving cell of the SeNB may overflow.

Therefore, a method for efficiently activating and deactivating a serving cell in the inter-cell aggregation environment in which the backhaul delay occurs and a method for sharing activation and deactivation state information on the serving cell between the base stations in which the backhaul delay occurs are required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and apparatus for activating and deactivating a serving cell having advantage of efficiently activating and deactivating a serving cell when a terminal aggregates and uses serving cells of base stations in which a backhaul delay occurs.

An exemplary embodiment of the present invention provides a method for activating and deactivating serving cells of at least one slave base station set in a terminal by a master base station. The method for activating and deactivating serving cells includes: selecting a target serving cell in which a state is changed, among the serving cells of at least one slave base station set in the terminal; generating a MAC control element which instructs a state change of the target serving cell; confirming an uplink synchronous state between a target slave base station managing the target serving cell and the terminal; and directly transmitting the MAC control element to the terminal in the case of an uplink asynchronous state between the target slave base station and the terminal.

The method for activating and deactivating serving cells may further include transmitting the MAC control element to the terminal through the target slave base station in the case of the uplink synchronous state between the target slave base station and the terminal.

The MAC control element may include an activation MAC control element which instructs the state of the target serving cell to be changed from the deactivation state to the activation state and a deactivation MAC control element which instructs the state of the target serving cell to be changed from the activation state to the deactivation state, and each field of the activation MAC control element and the deactivation MAC control element may correspond to the serving cell of the at least one slave base station.

The generating may include setting a value of a field corresponding to a target serving cell to be activated among fields of the activation MAC control element to be 1 and setting values of fields corresponding to the remaining serving cells to be 0, when the state of the target serving cell is instructed to be changed from the deactivation state to the activation state.

The generating may include setting the value of the field corresponding to the target serving cell to be deactivated among the fields of the deactivation MAC control element to be 1 and setting the values of the fields corresponding to the remaining serving cells to be 0, when the state of the target serving cell is instructed to be changed from the activation state to the deactivation state.

The method for activating and deactivating serving cells may further include exchanging state information of the serving cells of at least one slave base station set in the terminal between the master base station and the at least one slave base station.

In the case of the uplink asynchronous state between the target slave base station and the terminal, the exchanging may include transmitting the MAC control element to the target slave base station.

The exchanging may include: receiving the state of the serving cell of the at least one slave base station set in the terminal from the target slave base station in which the state of the target serving cell is changed, in response to the MAC control element; and updating the state of the serving cell of the at least one slave base station set in the terminal based on the received state of the serving cell of the at least one slave base station.

The exchanging may include receiving the state of the serving cell of the at least one slave base station set in the terminal from the slave base station in which the state of the serving cell set in the terminal among the at least one slave base station is changed.

Another embodiment of the present invention provides a method for activating and deactivating serving cells of a master base station and at least one slave base station, which are set in a terminal, by the terminal. The method for activating and deactivating serving cells may include: receiving an activation MAC control element; receiving a deactivation MAC control element; changing a state of a first target serving cell among the serving cells of the at least one slave base station set in the terminal to an activation state based on the activation MAC control element; and changing a state of a second target serving cell among the serving cells of the at least one slave base station set in the terminal to a deactivation state based on the deactivation MAC control element.

The receiving of the activation MAC control element may include receiving the activation MAC control element from the master base station in the case of an uplink asynchronous state between the first target slave base station managing the first target serving cell and the terminal; and the receiving of the deactivation MAC control element may include receiving the deactivation MAC control element from the master base station in the case of an uplink asynchronous state between a second target slave base station managing the second target serving cell and the terminal.

The receiving of the activation MAC control element may include receiving the activation MAC control element from the first target slave base station in the case of an uplink synchronous state between the first target slave base station and the terminal; and the receiving of the deactivation MAC control element may include receiving the deactivation MAC control element from the second target slave base station in the case of the uplink synchronous state between the second target slave base station and the terminal.

The method for activating and deactivating serving cells may further include: transmitting a receiving confirmation message of the activation MAC control element; and transmitting a receiving confirmation message of the deactivation MAC control element.

The changing based on the activation MAC control element may include: maintaining states of the remaining serving cells other than the first target serving cell among the serving cells of the at least one slave base station set in the terminal; and the changing based on the deactivation MAC control element may include maintaining states of the remaining serving cells other than the second target serving cell among the serving cells of the at least one slave base station set in the terminal.

Yet another embodiment of the present invention provides an apparatus for activating and deactivating a serving cell of a mater base station activating and deactivating serving cells of at least one slave base station set in a terminal. The apparatus for activating and deactivating a serving cell includes a processor and a transceiver. The processor may be configured to select a target serving cell in which a state is changed among serving cells of the at least one slave base station set in the terminal and generate a MAC control element instructing a state change of the target serving cell. The transceiver may be configured to transmit the MAC control element to the terminal or the target slave base station in response to an uplink synchronous state between a target slave base station managing the target serving cell and the terminal.

The transceiver may transmit the MAC control element to the terminal in the case of the uplink asynchronous state between the target slave base station and the terminal and transmit the MAC control element to the target slave base station in the case of the uplink synchronous state between the target slave base station and the terminal.

The MAC control element may include an activation MAC control element which instructs the state of the target serving cell to be changed from the deactivation state to the activation state and a deactivation MAC control element which instructs the state of the target serving cell to be changed from the activation state to the deactivation state, and each field of the activation MAC control element and the deactivation MAC control element may correspond to the serving cell of the at least one slave base station.

The processor may set a value of a field corresponding to a target serving cell to be activated among fields of the activation MAC control element to be 1 and set values of fields corresponding to the remaining serving cells maintaining the state to be 0, when the state of the target serving cell is instructed to be changed from the deactivation state to the activation state.

The processor may set a value of a field corresponding to a target serving cell to be deactivated among fields of the deactivation MAC control element to be 1 and set values of fields corresponding to the remaining serving cells maintaining the state to be 0, when the state of the target serving cell is instructed to be changed from the activation state to the deactivation state.

The transceiver may receive the state of the serving cell of the at least one slave base station set in the terminal from the target slave base station in which the state of the target serving cell is changed, in response to the MAC control element; and the processor may synchronize the state of the serving cell of the at least one slave base station set in the terminal based on the received state of the serving cell of the at least one slave base station.

DETAILED DESCRIPTION OF THE EMBODIMENTS

Figure 1:
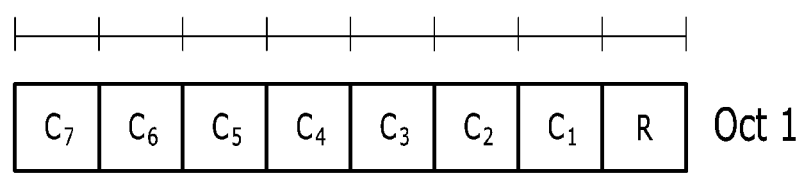
FIG. 1 is a diagram illustrating an activation/deactivation MAC CE according to the related art.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification and claim, unless explicitly described to the contrary, the word "comprise" and variations such as "comprises" or "comprising" will be understood to imply the inclusion of stated elements but not the exclusion of any other elements.

Hereinafter, a method and an apparatus for activating and deactivating a serving cell according to an exemplary embodiment of the present invention will be described in detail with reference to the accompanying drawings.

Figure 2:
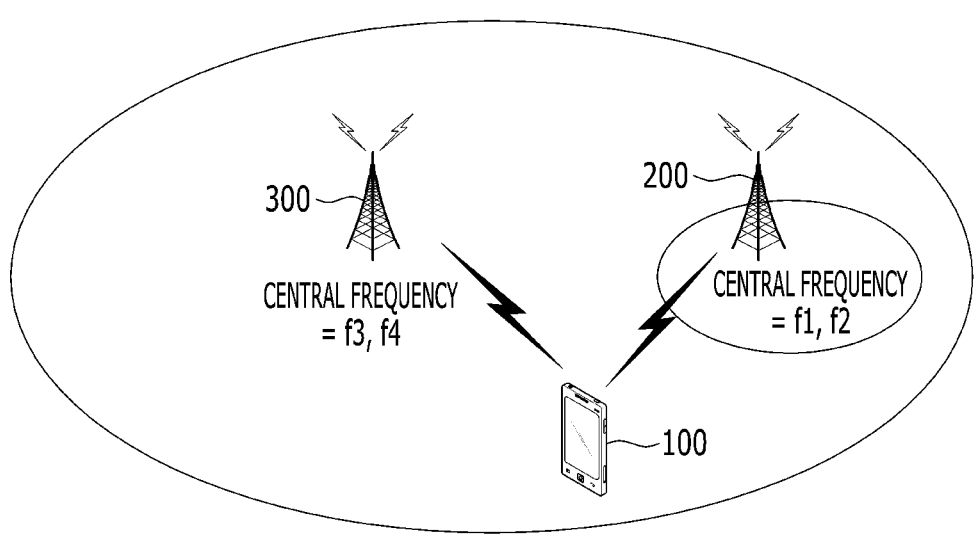
FIG. 2 is a diagram illustrating an example of a carrier aggregation system according to an exemplary embodiment of the present invention.

FIG. 2 is a diagram illustrating an example of a carrier aggregation system according to an exemplary embodiment of the present invention.

Referring to FIG. 2, a carrier aggregation system is a system which collects at least one component carrier to configure a broadband.

A serving cell may be configured of a pair of two component carriers such as a downlink component carrier and an uplink component carrier, or may be configured of only a downlink component carrier.

A terminal 100 aggregates a plurality of serving cells to transmit/receive data, thereby providing a higher data speed. One of the plurality of serving cells is set as a primary cell and the remaining serving cells are set as a secondary cell, in which the primary serving cell maintains an activation state at all times and the secondary serving cell is activated or deactivated depending on a specific condition.

The terminal 100 may aggregate serving cells which are managed by different base stations 200 and 300. For example, when the base station 200 uses the serving cells of which the central frequencies are f1 and f2 to transmit/receive data and the base station 300 uses the serving cells of which the central frequencies are f3 and f4 to transmit/receive data, the terminal 10 may aggregate and use the serving cells having the frequencies f1 and f2 of the base station 200 and the serving cells having the frequencies f3 and f4 of the base station 300.

The base station 200 manages connection information of the terminal 100 and traffic transmitted to the terminal 100 and is a master base station (Master eNB, MeNB).

The base station 300 is a base station which is additionally set to transmit traffic to the terminal and is a slave base station (Slave eNB, SeNB).

The MeNB 200 manages a serving cell list belonging to the MeNB 200 set in the terminal 100, a serving cell list belonging to the SeNB 300 set in the terminal 100, and the activation or deactivation states of each serving cell. The MeNB 200 determines whether the serving cells belonging to the SeNB 300 set in the terminal 100 are activated or deactivated. The MeNB 200 may determine whether the serving cells belonging to the SeNB 300 are activated/deactivated for each SeNB.

The SeNB 300 manages the activation or deactivation states of the serving cells belonging to the SeNB set in the terminal 100.

The MeNB 200 generates the activation MAC CE to activate the serving cell of the SeNB 300 which determines the activation. The MeNB 200 generates the deactivation MAC CE to deactivate the serving cell of the SeNB 300 which determines the deactivation.

In the case of an uplink synchronous state between the SeNB 300 and the terminal 100, the activation MAC CE and the deactivation MAC CE are transmitted from the SeNB 300 to the terminal 100, and in the case of the uplink asynchronous state between the SeNB 300 and the terminal 100, the activation MAC CE and the deactivation MAC CE are transmitted from the MeNB 200 to the terminal 100.

When the states of the serving cells belonging to the SeNB 300 set in the terminal 100 are changed, the SeNB 300 transmits the activation and deactivation states of each of the serving cells of the SeNB 300 to the MeNB 200.

When the MeNB 200 receives the activation and deactivation states of each of the serving cells of the SeNB 300 from the SeNB 300, the MeNB 200 updates the activation and deactivation states of the serving cells of the SeNB 300 which are managed by the MeNB 200.

When the terminal 100 receives the activation MAC CE, the serving cells of the SeNB 300 are activated in response to each field value of the activation MAC CE. When the terminal 100 receives the deactivation MAC CE, the serving cells of the SeNB 300 are deactivated in response to each field value of the deactivation MAC CE.

Figure 3:
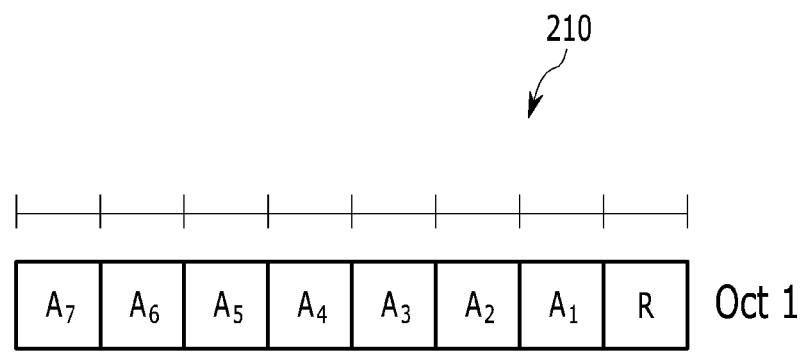
FIG. 3 is a diagram illustrating an example of an activation MAC CE according to an exemplary embodiment of the present invention.
Figure 4:
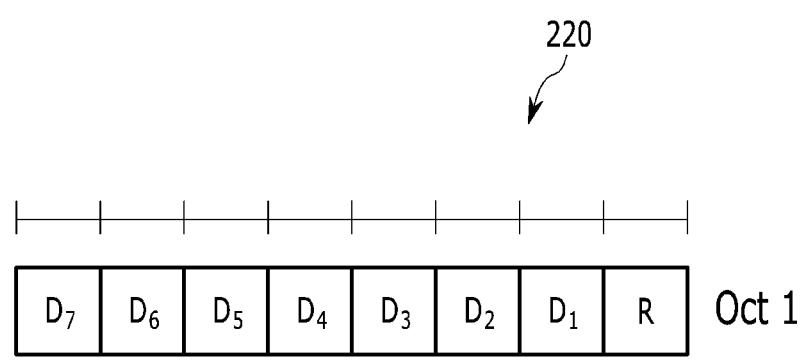
FIG. 4 is a diagram illustrating an example of a deactivation MAC CE according to an exemplary embodiment of the present invention.

FIG. 3 is a diagram illustrating an example of an activation MAC CE according to an exemplary embodiment of the present invention, and FIG. 4 is a diagram illustrating an example of a deactivation MAC CE according to an exemplary embodiment of the present invention.

Referring to FIG. 3, the activation MAC CE 210 instructs the activation of the serving cells belonging to the SeNB 300 set in the terminal 100. Each field A1 to A7 of the activation MAC CE is a field which instructs the activation of the serving cells belonging to the SeNB 300 set in the terminal 100, and a field Ai value corresponding to the serving cell to be activated is set to be 1. That is, when the Ai value is set to be 1, the activation of the serving cell set to be a serving cell index i is instructed.

Referring to FIG. 4, the deactivation MAC CE 220 instructs the deactivation of the serving cells belonging to the SeNB 300 set in the terminal 100. Each field D1 to D7 of the deactivation MAC CE is a field which instructs the deactivation of the serving cells belonging to the SeNB 300 set in the terminal 100 and a field Di value corresponding to the serving cell to be deactivated is set to be 1. That is, when the Di value is set to be 1, the deactivation of the serving cell set to be the serving cell index i is instructed.

As such, according to the exemplary embodiment of the present invention, unlike the related art, in order to instruct the activation and the deactivation of each of the serving cells set in the terminal 100, the activation MAC CE 210 and the deactivation MAC CE 220 are used.

Figure 5:
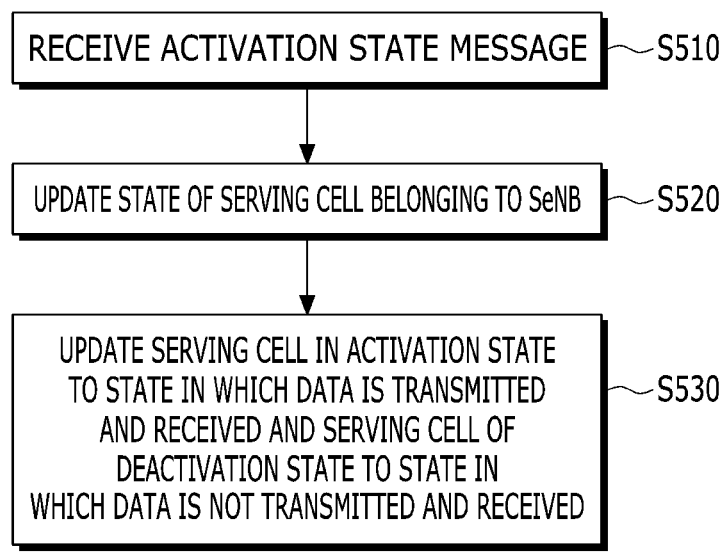
FIG. 5 is a flowchart illustrating a method for synchronizing a state of a serving cell set in a terminal between an MeNB and an SeNB according to the exemplary embodiment of the present invention.

FIG. 5 is a flowchart illustrating a method for synchronizing a state of a serving cell set in a terminal between an MeNB and an SeNB according to the exemplary embodiment of the present invention.

Referring to FIG. 5, when the states of the serving cells belonging to the SeNB 300 set in the terminal 100 are changed, the SeNB 300 transmits the activation state message including the activation or deactivation states of each of the serving cells of the SeNB 300 set in the terminal 100 to the MeNB 200. Herein, the state change includes a change from the activation state to the deactivation state or a change from the deactivation state to the activation state.

When the MeNB 200 receives the activation state message from the SeNB 300 (S510), the MeNB 200 updates the activation or deactivation states of the serving cells belonging to the SeNB 300 set in the terminal 100 in response to the received activation state message (S520). By doing so, the MeNB 200 may share the activation and deactivation states of the serving cells, along with the SeNB 300.

Next, when the states of the serving cells belonging to the SeNB 300 are changed to the activation state, the MeNB 200 updates the corresponding serving cell to the state in which data may be transmitted/received, and when the states of the serving cells belonging to the SeNB 300 are changed to the deactivation state, updates the corresponding serving cell to the state in which data may not be transmitted/received. By doing so, the MeNB 200 transmits and receives data through the serving cells in the activation state among the serving cells belonging to the SeNB 300 to disperse a load of the MeNB 200, and may not transmit/receive data through the serving cells in the deactivation state.

Figure 6:
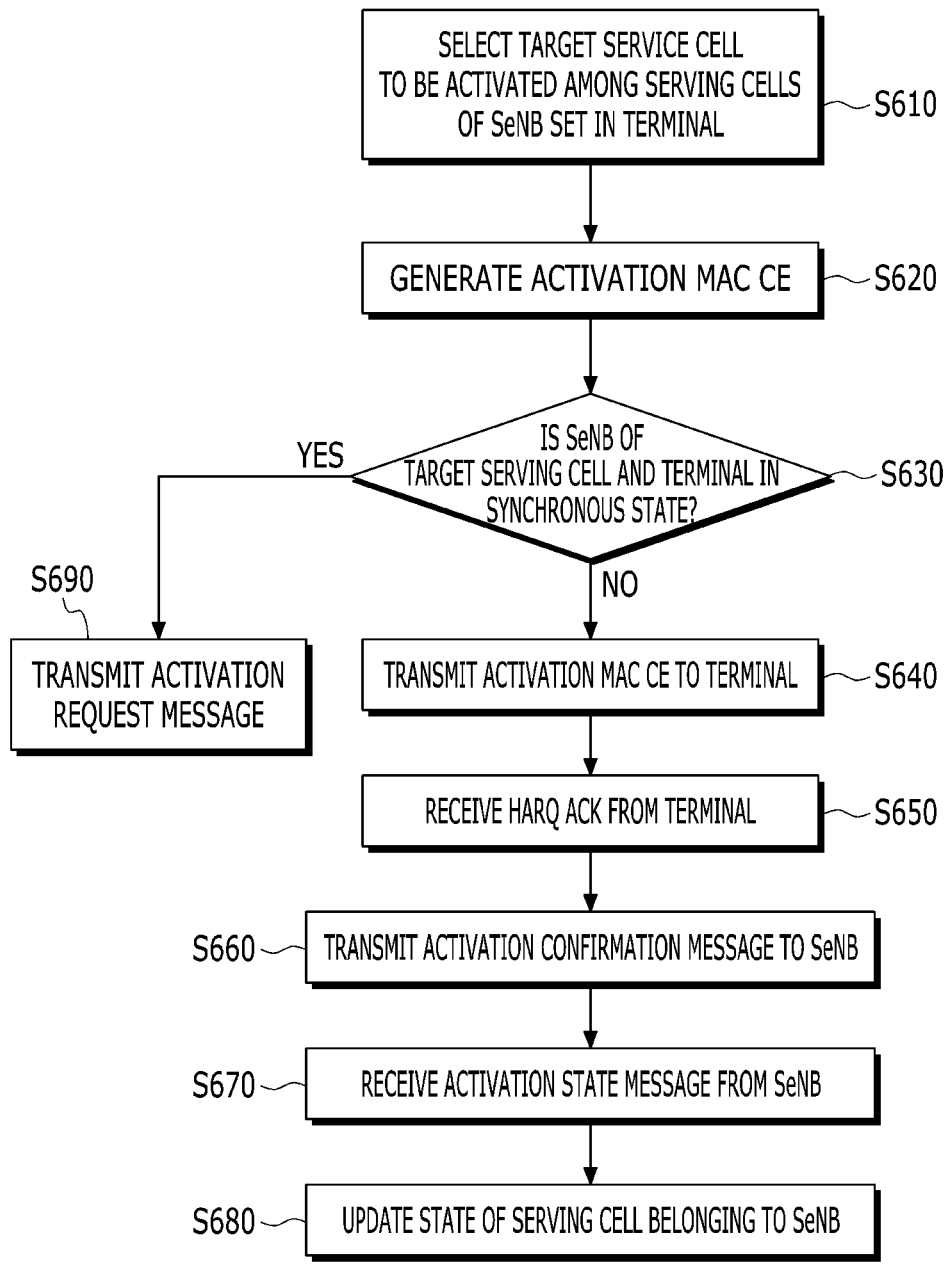
FIG. 6 is a flowchart illustrating a method for activating a serving cell of the SeNB set in the terminal in the MeNB according to the exemplary embodiment of the present invention.

FIG. 6 is a flowchart illustrating a method for activating a serving cell of the SeNB set in the terminal in the MeNB according to the exemplary embodiment of the present invention.

Referring to FIG. 6, when the MeNB 200 transmits/receives the downlink or uplink data through the serving cells of the SeNB 300, the MeNB 200 selects a target serving cell to be activated among the serving cells in the deactivation state of the SeNB 300 set in the terminal 100 (S610). The MeNB 200 may determine that a downlink average buffer amount of the terminal 100 is larger than a total downlink transmission amount transmitted to the activated serving cell of the terminal 100 or an uplink average buffer amount is larger than a total uplink transmission amount transmitted to the activated serving cell of the terminal 100 or at least one serving cell in the deactivation state among the serving cells of the SeNB 300 set in the terminal 100 is activated by a base station operation policy.

The MeNB 200 generates the activation MAC CE to instruct the state of the target serving cell to be in the activation state (S620). The field corresponding to the target serving cell to be activated among each of the fields of the activation MAC CE is set to be 1, and the remaining fields are set to be 0.

The MeNB 200 confirms the uplink synchronous state between the SeNB 300 managing the target serving cell and the terminal 100 (S630).

When the SeNB 300 managing the target serving cell and the terminal 100 are in the uplink asynchronous state, the MeNB 200 transmits the generated activation MAC CE to the terminal 100 (S640). A method for confirming whether the SeNB 300 managing the target serving cell and the terminal 100 by the MeNB 200 are in the uplink synchronous state is performed by performing a separate procedure, and the detailed thereof will be omitted.

When the terminal 100 receives the activation MAC CE, the terminal 100 decodes the received MAC CE to confirm whether an error is detected, and if it is determined that the error does not occur, transmits a hybrid automatic repeat request (HARQ) acknowledgment (ACK) message as a response signal to the MeNB 200. However, if it is determined that the error is detected in the terminal 100, the terminal 100 transmits a negative acknowledgement (NACK) signal as the response signal to the MeNB 200. In this case, the MeNB 200 may re-transmit the activation MAC CE to the terminal 100.

Further, the terminal 100 activates the serving cell corresponding to a field in which a value of 1 is set and maintains the state of the serving cell corresponding to a field in which a value of 0 is set, based on the values of each field of the activation MAC CE. That is, when an $A_i$ value of the activation MAC CE is set to be 1, the terminal 100 activates the serving cell corresponding to the serving cell index I, and when the $A_i$ value is set to be 0, the terminal 100 maintains the state of the serving cell corresponding to the serving cell index i.

When the MeNB 200 receives the HARQ ACK message from the terminal 100 (S650), the MeNB 200 transmits the activation confirmation message including the activation MAC CE to the SeNB 300 (S660).

Figure 7:
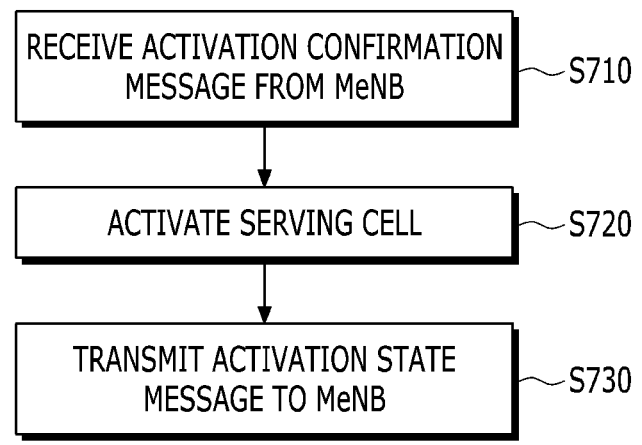
FIG. 7 is a flowchart illustrating a method for processing an activation confirmation message in the SeNB according to the exemplary embodiment of the present invention.

FIG. 7 is a flowchart illustrating a method for processing an activation confirmation message in the SeNB according to the exemplary embodiment of the present invention.

Referring to FIG. 7, when the SeNB 300 receives the activation confirmation message (S710), the SeNB 300 activates the serving cell corresponding to a field in which a value of 1 is set based on the field value of the activation MAC CE (S720).

Next, the SeNB 300 transmits the activation state message including the activation or deactivation states of each of the serving cells of the SeNB 300 set in the terminal 100 to the MeNB 200 (S730).

Referring back to FIG. 6, when the MeNB 200 receives the activation state message from the SeNB 300 (S670), according to the method described with reference to FIG. 5, the MeNB 200 updates the states of the serving cells belonging to the SeNB 300 based on the activation state message (S680).

According to the exemplary embodiment of the present invention, when the uplink synchronous state between the SeNB 300 managing the target serving cell to be activated and the terminal 100 is in the asynchronous state, the activation MAC CE is transmitted from the MeNB 200 to the terminal 100 and the activation confirmation message and the activation state message are exchanged between the MeNB 200 and the SeNB 300, thereby solving the mismatch phenomenon in the activation and deactivation states of the serving cells between the base stations.

Meanwhile, when the SeNB 300 managing the target serving cell and the terminal 100 are in the uplink synchronous state, the MeNB 200 transmits the activation request message including the activation MAC CE to the SeNB 300 (S690).

Figure 8:
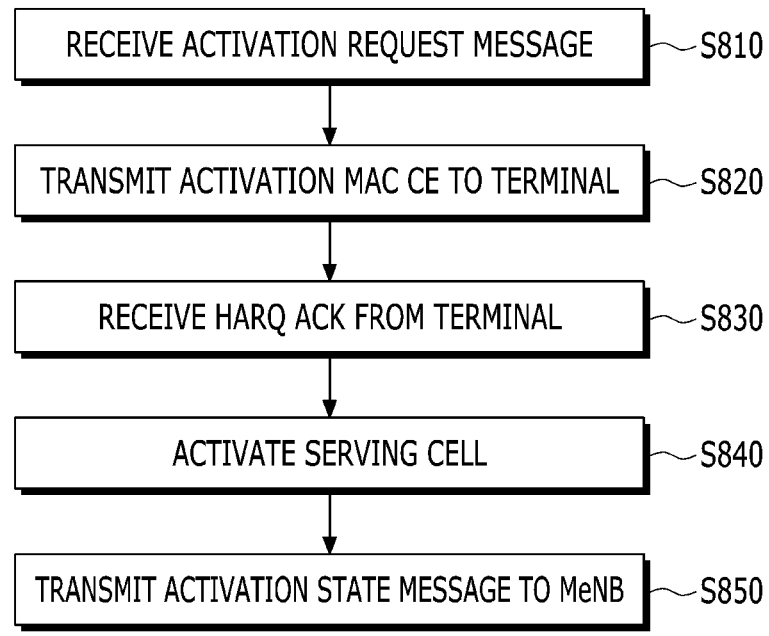
FIG. 8 is a flowchart illustrating a method for processing an activation request message in the SeNB according to the exemplary embodiment of the present invention.

FIG. 8 is a flowchart illustrating a method for processing an activation request message in the SeNB according to the exemplary embodiment of the present invention.

Referring to FIG. 8, when the SeNB 300 receives the activation request message in the uplink synchronous state with the terminal 100 (S810), the SeNB 300 transmits the activation MAC CE included in the activation request message to the terminal 100 (S820).

When the terminal 100 receives the activation MAC CE from the SeNB 300, the terminal decodes the received activation MAC CE to confirm whether the error is detected, and if it is determined that the error does not occur, transmits the HARQ ACK message as the response signal to the SeNB 300. However, if it is determined that the error is detected, the terminal 100 transmits the NACK signal as the response signal to the SeNB 300. In this case, the SeNB 300 may re-transmit the activation MAC CE to the terminal 100.

Further, the terminal 100 activates the serving cell corresponding to a field in which a value of 1 is set and maintains the state of the serving cell corresponding to a field in which a value of 0 is set, based on the values of each field of the activation MAC CE. That is, when the $A_i$ value of the activation MAC CE is set to be 1, the terminal 100 activates the serving cell corresponding to the serving cell index i, and when the $A_i$ value is set to be 0, the terminal 100 maintains the state of the serving cell corresponding to the serving cell index i.

When the SeNB 300 receives the HARQ ACK message from the terminal 100 (S830), the SeNB 300 activates the serving cell corresponding to the field in which the value of 1 is set based on the field value of the activation MAC CE (S840).

Next, the SeNB 300 transmits the activation state message including the activation or deactivation states of each of the serving cells of the SeNB 300 set in the terminal 100 to the MeNB 200 (S850).

When the MeNB 200 receives the activation state message from the SeNB 300, according to the method described with reference to FIG. 5, the MeNB 200 updates the states of the serving cells belonging to the SeNB 300 based on the activation state message.

By doing so, the activation MAC CE transmitted from the SeNB 300 instructs the activation of the serving cells belonging to the SeNB 300 set in the terminal 100, and may not affect the activation or deactivation states of the serving cells of the MeNB 200 or another SeNB which is set in the terminal 100.

According to the exemplary embodiment of the present invention, when the uplink synchronous state between the SeNB 300 managing the target serving cell to be activated and the terminal 100 is in the synchronous state, the activation MAC CE included in the activation request message received from the MeNB 200 is transmitted from the SeNB 300 to the terminal 100 and the activation state message is transmitted from the SeNB 300 to the MeNB 200, thereby solving the mismatch phenomenon in the activation and deactivation states of the serving cells between the base stations.

Next, a method for deactivating the serving cells of the SeNB set in the terminal 100 by the MeNB 200 will be described. The method for deactivating the serving cells of the SeNB set in the terminal 100 by the MeNB 200 is similar to the method for activating the serving cells of the SeNB set in the terminal 100 by the MeNB 200. However, the deactivating method is different from the activating method in that the MeNB 200 uses the deactivation MAC CE to instruct the deactivation of the serving cells of the SeNB set in the terminal 100.

Figure 9:
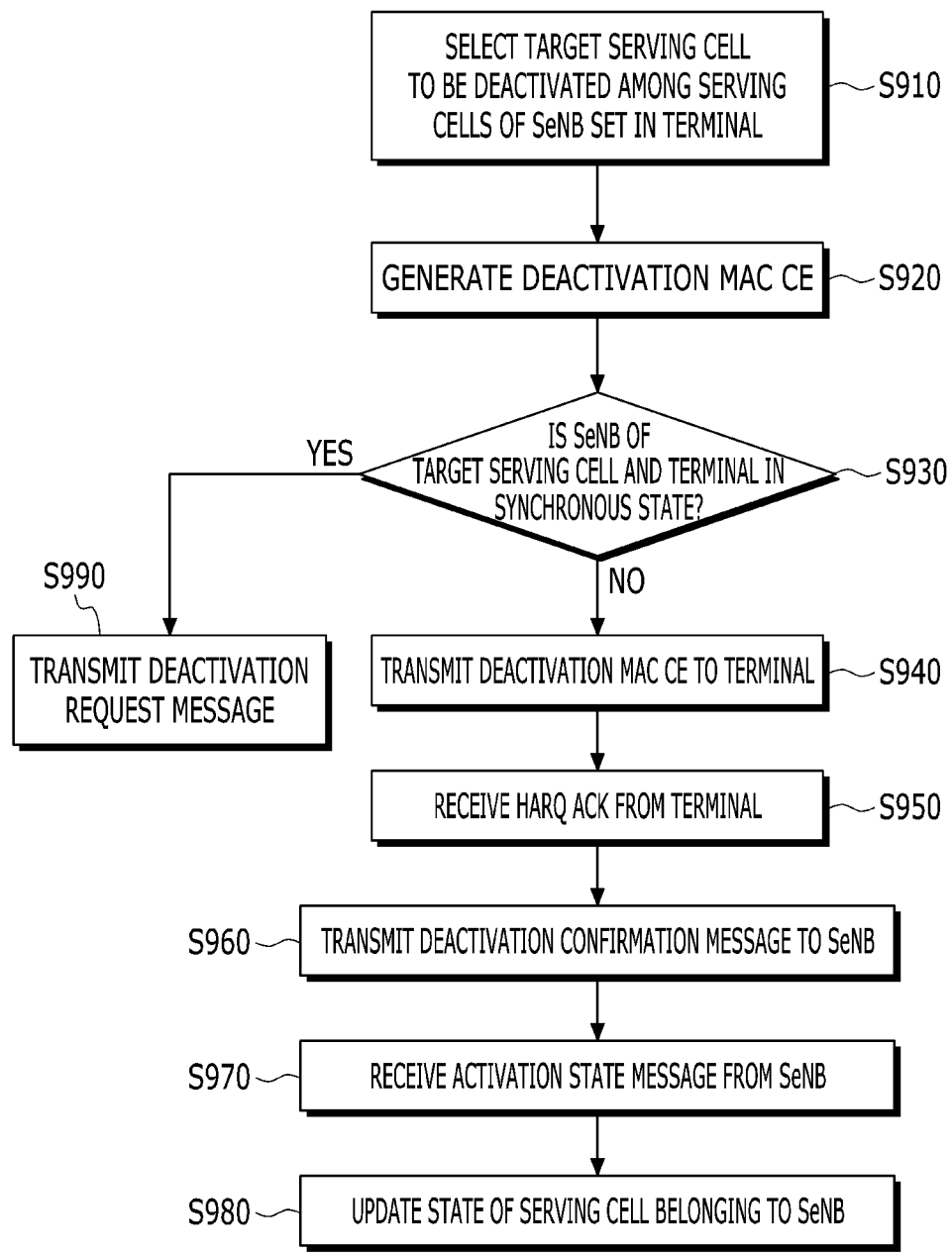
FIG. 9 is a flowchart illustrating a method for deactivating a serving cell of the SeNB set in the terminal in the MeNB according to the exemplary embodiment of the present invention.

FIG. 9 is a flowchart illustrating a method for deactivating a serving cell of the SeNB set in the terminal in the MeNB according to the exemplary embodiment of the present invention.

Referring to FIG. 9, when the MeNB 200 stops transmitting/receiving the downlink or uplink data through the serving cells of the SeNB 300, the MeNB 200 selects a target serving cell to be deactivated among the serving cells in the activation state of the SeNB 300 set in the terminal 100 (S910). The MeNB may determine that the downlink average buffer amount of the terminal 100 is reduced to make the total downlink transmission amount transmitted to the remaining activated serving cells other than the target serving cell among the serving cells in the activation state of the SeNB 300 set in the terminal 100 be larger than the downlink average buffer amount of the terminal 100, or the uplink average buffer amount of the terminal 100 is reduced to make the total uplink transmission amount transmitted to the remaining activated serving cells other than the target serving cell among the serving cells in the activation state of the SeNB 300 set in the terminal 100 be larger than the uplink average buffer amount of the terminal 100, or at least one of the serving cells in the activation state of the SeNB 300 set in the terminal 100 is deactivated by a base station operation policy.

The MeNB 200 generates the deactivation MAC CE to instruct the state of the target serving cell to be in the deactivation state (S920). The field corresponding to the target serving cell to be deactivated among each of the fields of the deactivation MAC CE is set to be 1, and the remaining fields are set to be 0 (S920).

The MeNB 200 confirms the uplink synchronous state between the SeNB 300 managing the target serving cell and the terminal 100 (S930).

When the SeNB 300 managing the target serving cell and the terminal 100 are in the uplink asynchronous state, the MeNB 200 transmits the generated deactivation MAC CE to the terminal 100 (S940).

When the terminal 100 receives the deactivation MAC CE, the terminal decodes the received deactivation MAC CE to confirm whether the error is detected, and if it is determined that the error does not occur, transmits the HARQ ACK message as the response signal to the MeNB 200. However, if it is determined that the error is detected in the terminal 100, the terminal 100 transmits the NACK signal as the response signal to the MeNB 200. In this case, the MeNB 200 may re-transmit the deactivation MAC CE to the terminal 100.

Further, the terminal 100 deactivates the serving cell corresponding to the field in which a value of 1 is set, and maintains the state of the serving cell corresponding to the field in which a value of 0 is set, based on the values of each field of the deactivation MAC CE. That is, when the $D_i$ value of the deactivation MAC CE is set to be 1, the terminal 100 deactivates the serving cell corresponding to the serving cell index i, and when the $D_i$ value is set to be 0, the terminal 100 maintains the state of the serving cell corresponding to the serving cell index i.

When the MeNB 200 receives the HARQ ACK message from the terminal 100 (S950), the MeNB 200 transmits the deactivation confirmation message including the deactivation MAC CE to the SeNB 300 (S960).

Figure 10:
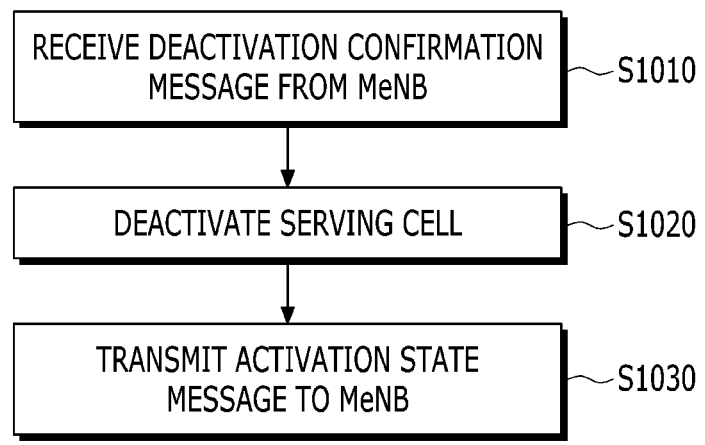
FIG. 10 is a flowchart illustrating a method for processing a deactivation confirmation message in the SeNB according to the exemplary embodiment of the present invention.

FIG. 10 is a flowchart illustrating a method for processing a deactivation confirmation message in the SeNB according to the exemplary embodiment of the present invention.

Referring to FIG. 10, when the SeNB 300 receives the deactivation confirmation message (S1010), the SeNB 300 deactivates the serving cell corresponding to the field in which a value of 1 is set based on the field value of the deactivation MAC CE (S1020).

Next, the SeNB 300 transmits the activation state message including the activation or deactivation states of each of the serving cells of the SeNB 300 set in the terminal 100 to the MeNB 200 (S1030).

Referring back to FIG. 9, when the MeNB 200 receives the activation state message from the SeNB 300 (S970), according to the method described with reference to FIG. 5, the MeNB 200 updates the states of the serving cells belonging to the SeNB 300 based on the activation state message (S980).

Meanwhile, when the SeNB 300 managing the target serving cell and the terminal 100 are in the uplink synchronous state, the MeNB 200 transmits the deactivation request message including the deactivation MAC CE to the SeNB 300 (S990).

Figure 11:
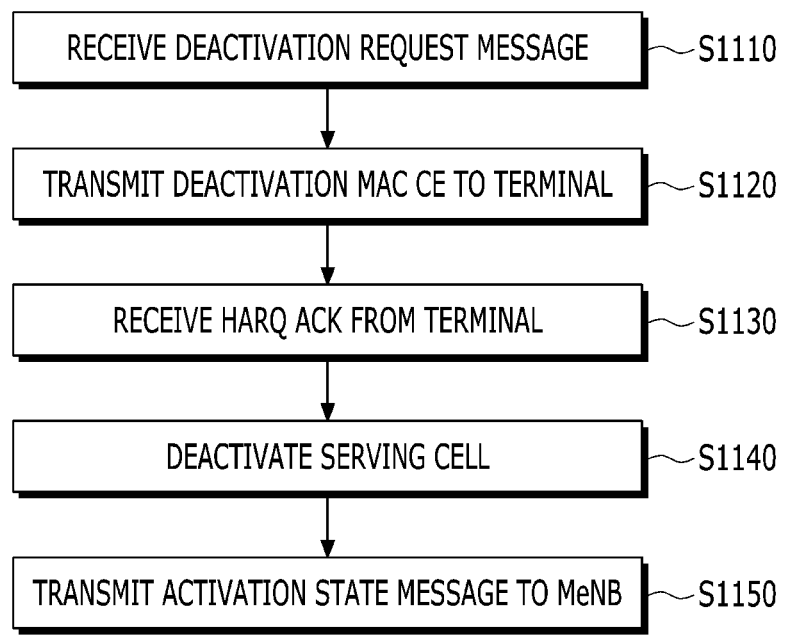
FIG. 11 is a flowchart illustrating a method for processing a deactivation request message in the SeNB according to the exemplary embodiment of the present invention.

FIG. 11 is a flowchart illustrating a method for processing a deactivation request message in the SeNB 300 according to the exemplary embodiment of the present invention.

Referring to FIG. 11, when the SeNB 300 receives the deactivation request message in the uplink synchronous state with the terminal 100, the SeNB 300 transmits the deactivation MAC CE included in the deactivation request message to the terminal 100 (S1120).

When the terminal 100 receives the deactivation MAC CE from the SeNB 300, the terminal decodes the received deactivation MAC CE to confirm whether the error is detected, and if it is determined that the error does not occur, transmits the HARQ ACK message as the response signal to the SeNB 300. However, if it is determined that the error is detected, the terminal 100 transmits the NACK signal as the response signal to the SeNB 300. In this case, the SeNB 300 may re-transmit the deactivation MAC CE to the terminal 100.

Further, the terminal 100 deactivates the serving cell corresponding to the field in which a value of 1 is set and maintains the state of the serving cell corresponding to the field in which a value of 0 is set, based on the values of each field of the deactivation MAC CE. That is, when the $D_i$ value of the activation MAC CE is set to be 1, the terminal 100 activates the serving cell corresponding to the serving cell index i, and when the $D_i$ value is set to be 0, the terminal 100 maintains the state of the serving cell corresponding to the serving cell index i.

When the SeNB 300 receives the HARQ ACK message from the terminal 100 (S1130), the SeNB 300 deactivates the serving cell corresponding to the field in which the value of 1 is set based on the field value of the deactivation MAC CE (S1140).

Next, the SeNB 300 transmits the activation state message including the activation or deactivation states of each of the serving cells of the SeNB 300 set in the terminal 100 to the MeNB 200 (S1150).

When the MeNB 200 receives the activation state message from the SeNB 300, according to the method described with reference to FIG. 5, the MeNB 200 updates the states of the serving cells belonging to the SeNB 300 based on the activation state message.

By doing so, the deactivation MAC CE transmitted from the SeNB 300 instructs the deactivation of the serving cells belonging to the SeNB 300 set in the terminal 100 and may not affect the activation or deactivation states of the serving cells of the MeNB 200 or another SeNB which is set in the terminal 100.

According to the related art, the activation/deactivation MAC CE instructs the activation or deactivation of each of at least one serving cell set in the terminal, and therefore includes not only activation and deactivation indicators of the serving cells of the base stations transmitting the activation/deactivation MAC CEs, but also activation and deactivation indicators of the serving cells of another base station set in the terminal. Therefore, when the activation/deactivation MAC CEs are transmitted from each of the base stations to the terminal in the state in which the activation and deactivation states of the serving cells between the base stations mismatch each other, the states of the serving cells between the base stations and the terminal may mismatch each other.

However, according to the exemplary embodiment of the present invention, the activation MAC CE or the deactivation MAC CE which is transmitted from the MeNB 200 and the SeNB 300 does not include the activation or deactivation indicators of the serving cells of another base station with the backhaul delay set in the terminal 100, but includes the activation or deactivation indicators for a set of serving cells in which the activation and deactivation states of the serving cells set in the terminal 100 are secured to be synchronous, for example, a set of serving cells belonging to one base station or a set of serving cells between the base stations without the backhaul delay, thereby solving the mismatch phenomenon in the activation and deactivation states of the serving cells between the base stations. In this case, even though the terminal 100 receives the activation MAC CE or the deactivation MAC CE from different base stations, the terminal 100 performs the activation or deactivation procedure on each serving cell corresponding to the field in which the value of 1 is set in each activation MAC CE or deactivation MAC CE, thereby matching the serving states between the base stations and the terminal.

Meanwhile, the activation and deactivation states of the secondary serving cells set in the terminal are also controlled by the secondary serving cell deactivation timers set in each of the secondary serving cells. The secondary serving cell deactivation timer restarts at the time of performing the secondary serving cell activation procedure. Further, when receiving uplink allocation information or downlink allocation information through the PDCCH of the secondary serving cell, the terminal restarts the secondary serving cell deactivation timer. Alternatively, when receiving the uplink allocation information or downlink allocation information on the secondary serving cells through the PDCCH of the serving cell which schedules the secondary serving cells of the terminal, the terminal restarts the secondary serving cell deactivation timer. When the secondary serving cell deactivation timer expires, the state of the secondary serving cells set in the terminal is changed from the activation state to the deactivation state.

In addition to the case in which the SeNB 300 receives the activation confirmation message or the activation request message from the MeNB 200, when the states of the serving cells set in the terminal 100 are changed from the deactivation state to the activation state or are changed from the activation state to the deactivation state, the SeNB 300 may transmit the activation state message including each activation or deactivation state of the serving cells of the SeNB 300 set in the terminal 100 to the MeNB 200. When the MeNB 200 receives the activation state message from the SeNB 300, the MeNB 200 updates the activation or deactivation states of the serving cells belonging to the SeNB 300 set in the terminal 100 in response to the received activation state message.

By doing so, in the cell aggregation environment between the base stations in which the backhaul delay occurs, the SeNB 300 transmits the activation state message including each activation or deactivation state of the serving cells of the SeNB 300 set in the terminal 100 to the MeNB 200 when the state of the serving cell is changed from the activation state to the deactivation state based on the secondary serving cell deactivation timers restarting depending on whether the downlink allocation or the uplink allocation is performed in a TTI unit in each of the secondary serving cells set in the terminal, thereby solving the mismatch phenomenon in the activation and deactivation states of the serving cells between the base stations.

Next, an apparatus for activating and deactivating a serving cell in the carrier aggregation system between the base stations according to the exemplary embodiment of the present invention will be described with reference to FIG. 12.

Figure 12:
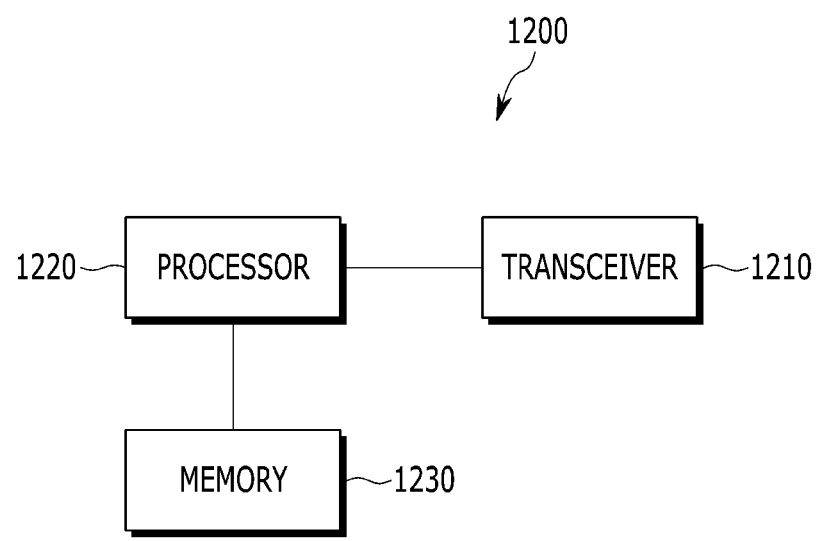
FIG. 12 is a diagram illustrating an apparatus for activating and deactivating a serving cell according to an exemplary embodiment of the present invention.

FIG. 12 is a diagram illustrating an apparatus for activating and deactivating a serving cell according to an exemplary embodiment of the present invention.

Referring to FIG. 12, an apparatus 1200 for activating and deactivating a serving cell includes a transceiver 1210, a processor 1220, and a memory 1230.

The apparatus 1200 for activating and deactivating a serving cell may be included in the MeNB 200 or may be the MeNB 200 itself.

The transceiver 1210 may transmit or receive the activation MAC CE or deactivation MAC CE or the messages which will be described with reference to FIGS. 5 to 11.

The processor 1220 manages the activation or deactivation states of the serving cell list and each of the serving cells set in the terminal 100. The serving cell list set in the terminal 100 may include the serving cell list of the MeNB 200 and the serving cell list of the SeNB 300.

The processor 1220 executes an instruction which processes the method for activating and deactivating a serving cell which is described with reference to FIGS. 5 to 11. The processor 1220 determines whether the serving cells in the deactivation state among the serving cells of the SeNB 300 set in the terminal 100 are activated and the serving cells in the activation state are deactivated, and the processor 1220 generates the activation MAC CE or the deactivation MAC CE to instruct the terminal 100 and the SeNB 300 to activate or deactivate the corresponding serving cell so as to activate or deactivate the target serving cell of the SeNB 300 determining the activation or the deactivation. In this case, the processor 1220 directly transmits the activation MAC CE or the deactivation MAC CE to the terminal 100 through the transceiver 1210 or transmits the activation MAC CE or the deactivation MAC CE from the SeNB 300, in response to the uplink synchronous state of the SeNB 300 and the terminal 100.

The processor 1220 may be implemented by a central processing unit (CPU), other chipsets, a microprocessor, and the like.

The memory 1230 stores instructions which are executed by the processor 1220.

According to the exemplary embodiments of the present invention, it is possible to remove the state mismatch of the serving cells between the base stations which may be caused by the backhaul delay between the base stations and disperse the inter-cell load based on the activation and deactivation states of the serving cells.

As set forth above, the method and apparatus for activating and deactivating a serving cell according to the exemplary embodiment of the present invention may be used in the system for providing the cell aggregation service between the base stations in which the backhaul delay occurs, and may also be used in the system for providing the cell aggregation service to the serving cells within the same base stations which may not share the state information of each serving cell set in the terminal in real time or in a serve frame unit.

The exemplary embodiments of the present invention may be implemented not only by the apparatus and/or the method as described above, but may be implemented by a program, a recording medium recorded with the program, and the like for realizing the functions corresponding to the configuration of the exemplary embodiment of the present invention, and may be easily implemented by a person having ordinary skill in the art to which the present invention pertains from the descriptions of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for activating and deactivating serving cells of at least one slave base station set in a terminal by a master base station, comprising:
    selecting a target serving cell in which a state is changed, among the serving cells of at least one slave base station set in the terminal;
    generating a MAC control element which instructs a state change of the target serving cell;
    determining whether an uplink between a target slave base station managing the target serving cell and the terminal is in a synchronous state or in an asynchronous state,
    wherein in response to the uplink between the target slave base station and the terminal being in an asynchronous state, directly transmitting the MAC control element to the terminal, and
    wherein in response to the uplink between the target slave base station and the terminal being in a synchronous state, transmitting the MAC control element to the terminal through the target slave base station.

2. The method of claim 1, wherein the MAC control element comprises an activation MAC control element which instructs the state of the target serving cell to be changed from a deactivation state to an activation state and a deactivation MAC control element which instructs the state of the target serving cell to be changed from the activation state to the deactivation state, and
    each field of the activation MAC control element and the deactivation MAC control element corresponds to a respective serving cell of the at least one slave base station.

3. The method of claim 2, wherein the generating comprises setting a value of a field corresponding to a target serving cell to be activated among fields of the activation MAC control element to be 1 and setting values of fields corresponding to the remaining serving cells to be 0, in response to the state of the target serving cell being instructed to be changed from the deactivation state to the activation state.

4. The method of claim 2, wherein the generating comprises setting the value of a field corresponding to a target serving cell to be deactivated among fields of the deactivation MAC control element to be 1 and setting values of fields corresponding to the remaining serving cells to be 0, in response to the state of the target serving cell being instructed to be changed from the activation state to the deactivation state.

5. The method of claim 1, further comprising:
    exchanging state information of the serving cells of at least one slave base station set in the terminal between the master base station and the at least one slave base station.

6. The method of claim 5, wherein, in the case of the uplink asynchronous state between the target slave base station and the terminal, the exchanging comprises transmitting the MAC control element to the target slave base station.

7. The method of claim 5, wherein the exchanging comprises:
    receiving the state of a serving cell of the at least one slave base station set in the terminal from the target slave base station in which the state of the target serving cell is changed, in response to the MAC control element; and
    updating the state of the serving cell of the at least one slave base station set in the terminal based on the received state of the serving cell of the at least one slave base station.

8. The method of claim 5, wherein the exchanging comprises receiving the state of a serving cell of the at least one slave base station set in the terminal from the slave base station in which the state of the serving cell set in the terminal among the at least one slave base station is changed.

9. A method for activating and deactivating serving cells of a master base station and at least one slave base station, which are set in a terminal, comprising:
    in response to the terminal receiving an activation MAC control element, the terminal changes a state of a first target serving cell to an activation state, wherein the first target serving cell is among the serving cells of the at least one slave base station set in the terminal; and
    in response to the terminal receiving a deactivation MAC control element, the terminal changes a state of a second target serving cell to a deactivation state, wherein the second target serving cell is among the serving cells of the at least one slave base station set in the terminal;
    wherein the receiving of the activation MAC control element comprises receiving the activation MAC control element from the master base station in the case of an uplink asynchronous state between a first target slave base station managing the first target serving cell and the terminal; and
    wherein the receiving of the deactivation MAC control element comprises receiving the deactivation MAC control element from the master base station in the case of an uplink asynchronous state between a second target slave base station managing the second target serving cell and the terminal.

10. The method of claim 9, wherein:
    the receiving of the activation MAC control element comprises receiving the activation MAC control element from the first target slave base station in the case of an uplink synchronous state between the first target slave base station and the terminal; and
    the receiving of the deactivation MAC control element comprises receiving the deactivation MAC control element from the second target slave base station in the case of the uplink synchronous state between the second target slave base station and the terminal.

11. The method of claim 9, further comprising:
    transmitting a receiving confirmation message of the activation MAC control element; and transmitting a receiving confirmation message of the deactivation MAC control element.

12. The method of claim 9, wherein:
the changing based on the activation MAC control element comprises maintaining states of the remaining serving cells other than the first target serving cell among the serving cells of the at least one slave base station set in the terminal; and
the changing based on the deactivation MAC control element comprises maintaining states of the remaining serving cells other than the second target serving cell among the serving cells of the at least one slave base station set in the terminal.

13. An apparatus for activating and deactivating a serving cell of a master base station activating and deactivating serving cells of at least one slave base station set in a terminal, comprising:
a processor configured to select a target serving cell in which a state is changed among serving cells of the at least one slave base station set in the terminal and generate a MAC control element instructing a state change of the target serving cell; and
a transceiver configured to:
transmit the MAC control element to the terminal through a target slave base station managing the target serving cell in response to an uplink synchronous state between the target slave base station and the terminal, and
directly transmit the MAC control element to the terminal in response to an uplink asynchronous state between the target slave base station and the terminal.

14. The apparatus of claim 13, wherein the MAC control element comprises an activation MAC control element which instructs the state of the target serving cell to be changed from a deactivation state to an activation state and a deactivation MAC control element which instructs the state of the target serving cell to be changed from the activation state to the deactivation state, and each field of the activation MAC control element and the deactivation MAC control element corresponds to a respective serving cell of the at least one slave base station.

15. The apparatus of claim 14, wherein the processor is further configured to:
set a value of a field corresponding to a target serving cell to be activated among fields of the activation MAC control element to be 1; and
set values of fields corresponding to the remaining serving cells maintaining the state to be 0, in response to the state of the target serving cell being instructed to be changed from the deactivation state to the activation state.

16. The apparatus of claim 14, wherein the processor is further configured to:
set a value of a field corresponding to a target serving cell to be deactivated among fields of the deactivation MAC control element to be 1; and
set values of fields corresponding to the remaining serving cells maintaining the state to be 0, in response to the state of the target serving cell being instructed to be changed from the activation state to the deactivation state.

17. The apparatus of claim 13, wherein:
the transceiver is further configured to receive the state of a serving cell of the at least one slave base station set in the terminal from the target slave base station in which the state of the target serving cell is changed, in response to the MAC control element; and
the processor is further configured to synchronize the state of the serving cell of the at least one slave base station set in the terminal based on the received state of the serving cell of the at least one slave base station.

* * * * *